(12) United States Patent
Schilder et al.

(10) Patent No.: US 12,601,400 B2
(45) Date of Patent: Apr. 14, 2026

(54) PLANETARY TRANSMISSION, IN PARTICULAR FOR A MOTOR VEHICLE

(71) Applicant: MERCEDES-BENZ GROUP AG, Stuttgart (DE)

(72) Inventors: Tobias Schilder, Ludwigsburg (DE); Heiner Kunckel, Heroldstatt (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 19/107,156

(22) PCT Filed: Jul. 21, 2023

(86) PCT No.: PCT/EP2023/070379
§ 371 (c)(1),
(2) Date: Feb. 27, 2025

(87) PCT Pub. No.: WO2024/046654
PCT Pub. Date: Mar. 7, 2024

(65) Prior Publication Data
US 2026/0078817 A1 Mar. 19, 2026

(30) Foreign Application Priority Data
Aug. 29, 2022 (DE) ..................... 10 2022 003 153.1

(51) Int. Cl.
*F16H 57/04* (2010.01)
*F16H 57/10* (2006.01)

(52) U.S. Cl.
CPC ..... *F16H 57/0484* (2013.01); *F16H 57/0423* (2013.01); *F16H 57/0427* (2013.01);
(Continued)

(58) Field of Classification Search
CPC ............. F16H 57/0423; F16H 57/0427; F16H 57/043; F16H 57/0471; F16H 57/0484; F16H 57/10
See application file for complete search history.

(56) References Cited

U.S. PATENT DOCUMENTS 5,702,320 A * 12/1997 Brassai ............... F16H 57/0427
                                                           475/159
2009/0247348 A1* 10/2009 Haupt ................. F16C 33/6677
                                                           475/159
(Continued)

FOREIGN PATENT DOCUMENTS

DE         7322916 U    11/1975
DE    102011086376 A1    5/2013
(Continued)

OTHER PUBLICATIONS

International Search Report and Written Opinion mailed Oct. 30, 2023 in related/corresponding International Application No. PCT/EP2023/070379.
(Continued)

*Primary Examiner* — Edwin A Young
(74) *Attorney, Agent, or Firm* — PATENT PORTFOLIO BUILDERS PLLC

(57) ABSTRACT

A planetary transmission has a collecting groove for a lubricant and a planetary gear set having a planetary support rotatable around a planetary gear set axis of rotation in relation to a housing of the planetary transmission, planetary gears rotatably mounted on the planetary support, and a ring gear meshing with the planetary gears. The transmission has a disc coupling having an inner disc support connected to the collecting groove in a rotationally fixed manner, an outer disc support connected to the housing of the planetary transmission in a rotationally fixed manner, and a set of friction discs. The inner disc support is connected to the ring
(Continued)

Figure 1:
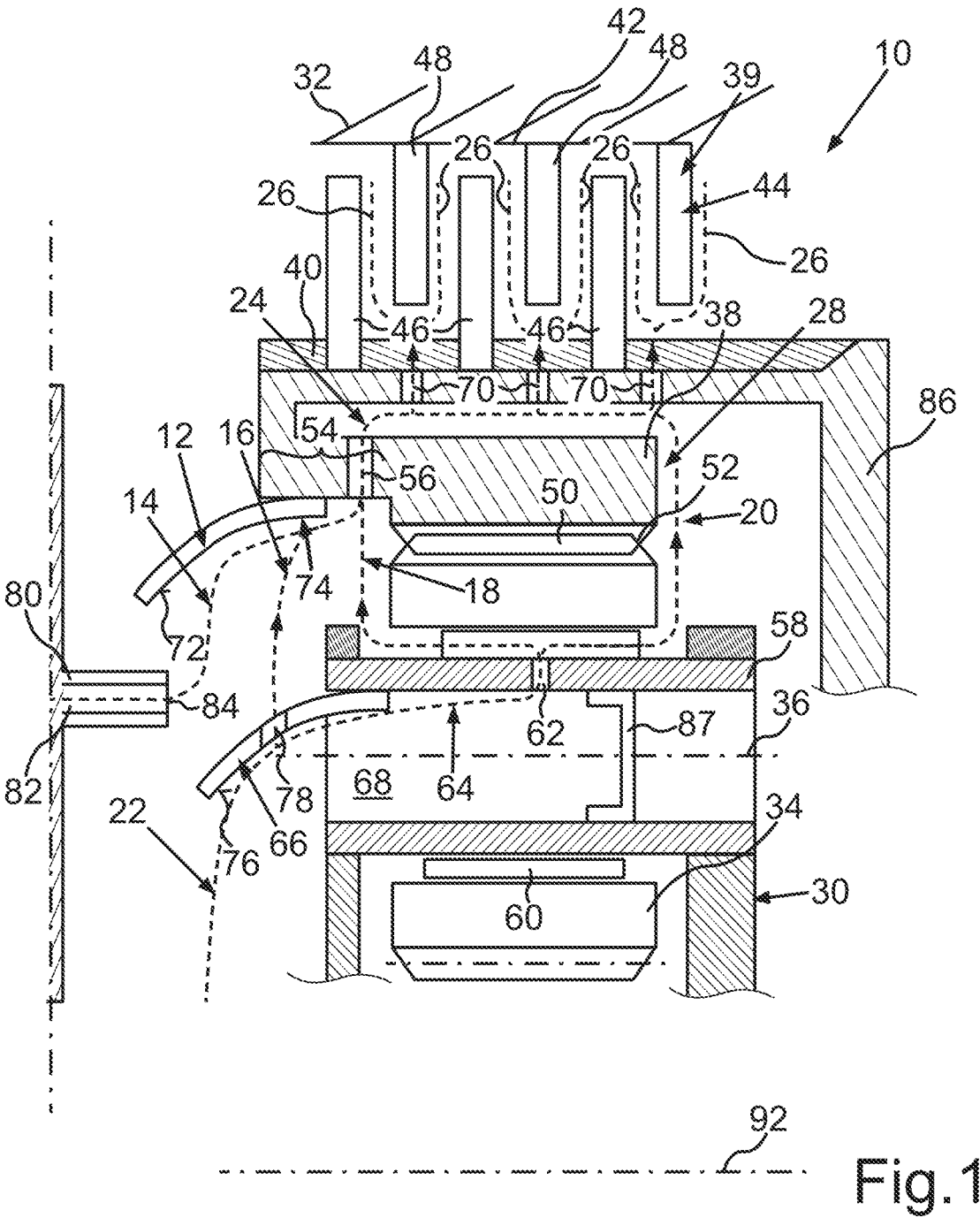

gear in a rotationally fixed manner. The ring gear and/or a cylinder portion connected to the ring gear in a rotationally fixed manner has a first lubricant channel running radially with respect to the planetary gear set axis of rotation.

9 Claims, 2 Drawing Sheets

(52) U.S. Cl.
CPC ....... *F16H 57/043* (2013.01); *F16H 57/0471* (2013.01); *F16H 57/10* (2013.01)

(56) References Cited

U.S. PATENT DOCUMENTS

| | | | |
|---|---|---|---|
| 2012/0028748 A1* | 2/2012 | Burgman | F16H 57/082 |
| | | | 475/159 |
| 2015/0233467 A1* | 8/2015 | Noerenberg | F16H 57/10 |
| | | | 192/221.1 |
| 2016/0327148 A1* | 11/2016 | Dinter | F16H 57/0479 |
| 2021/0262397 A1* | 8/2021 | Di Giovanni | F16H 57/0479 |
| 2025/0137529 A1* | 5/2025 | Ertas | F02C 7/06 |

FOREIGN PATENT DOCUMENTS

| | | |
|---|---|---|
| JP | S5142861 A | 4/1976 |
| JP | H0893889 A | 4/1996 |
| JP | 2010065741 A | 3/2010 |
| KR | 20120037781 A | 4/2012 |
| KR | 20170041318 A | 4/2017 |

OTHER PUBLICATIONS

Office Action created Apr. 5, 2023 in related/corresponding DE Application No. 10 2022 003 153.1.

* cited by examiner

PLANETARY TRANSMISSION, IN PARTICULAR FOR A MOTOR VEHICLE

BACKGROUND AND SUMMARY OF THE INVENTION

Exemplary embodiments of the invention relate to a planetary transmission, in particular for a motor vehicle, i.e., in particular for a drivetrain of a motor vehicle.

An oil supply device for a multi-disc brake in a transmission module is known from DE 10 2011 086 376 A1.

DE 73 22 916 U, JP H08-93 889 A and the generic KR 10 2012 0 037 781 A each show planetary transmissions, wherein a lubricant collecting groove connected to an inner disc support of a coupling and a lubricant channel running radially in a ring gear are provided.

Exemplary embodiments of the present invention are directed to a planetary transmission, in particular for a motor vehicle, such that a particularly advantageous lubricant supply can be implemented.

The invention relates to a planetary transmission, in particular for a motor vehicle and more particularly for a drivetrain of a motor vehicle. This means, for example, that the motor vehicle, which is also simply referred to as a vehicle and is formed, for example, as a car, in particular as a passenger car, has the planetary transmission in its completely produced state. In particular, the motor vehicle has the drivetrain, by means of which the motor vehicle can be driven. The drivetrain here comprises the planetary transmission. For example, vehicle wheels of the motor vehicle can be driven by a drive device of the motor vehicle via the planetary transmission. In doing so, the motor vehicle can be driven as a whole. The drive device is or comprises an electric engine. Alternatively or additionally, the drive device is or comprises, for example, an internal combustion engine.

The planetary transmission has a collecting groove for a lubricant. The collecting groove is also referred to as the first collecting groove. When the collecting groove is referred to in the following, this is understood to mean the first collecting groove, unless otherwise specified. The collecting groove is a collecting element by means of which the preferably liquid lubricant, which is formed as an oil, for example, can be collected and then guided or channeled in a targeted manner. In particular, for example, the collecting groove has a curved, in particular concave, surface which faces, for example, an outlet through which the lubricant can flow and via which the lubricant can be provided. In particular, the preferably liquid lubricant can be sprayed out of the outlet and can thus be provided via the outlet. The lubricant flowing through the outlet, in particular sprayed out of the outlet, can flow against the collecting groove, in particular against the surface functioning as a collecting surface, and can thus be collected by the surface, whereupon, for example, the lubricant collected by means of the collecting groove, in particular by means of the surface, can be guided in a targeted manner to at least one location, in particular the lubrication point, by means of the collecting groove. At this location, the lubricant can, for example, lubricate and/or cool at least two components that can be moved in relation to each other.

The planetary transmission has a planetary gear set, which is also simply referred to as a planetary set. The planetary gear set has at least one planetary support, also known as a web, which can be rotated around a planetary gear set axis of rotation in relation to a housing of the planetary transmission. For example, the planetary support is at least partially arranged in the housing. The planetary gear set also has planet wheels rotatably mounted on the planetary support. In particular, the respective planetary wheel is held on the planetary support so that it can rotate about a respective planetary wheel axis of rotation in relation to the planetary support. Here, it is provided, for example, that the respective planetary gear axis of rotation runs in parallel to the planetary gear set axis of rotation and is spaced apart from the planetary gear set axis of rotation. In particular, it is conceivable that the planetary gear axes of rotation are spaced apart from one another, in particular in the peripheral direction of the planetary gear set, which runs around the planetary gear set axis of rotation. In particular, the planetary gear axes of rotation are arranged on a common circle, the center of which lies on the planetary gear set axis of rotation, for example. The planetary gear set also has a ring gear that meshes with the planetary gears. In particular, the ring gear can be rotated around the planetary gear set axis of rotation in relation to the housing of the planetary transmission. For example, the ring gear is arranged at least partially in the housing. In particular, it is conceivable that the planetary wheels are arranged at least partially in the housing.

The planetary transmission also has a disc coupling, which has an inner disc support connected to the collecting groove in a rotationally fixed manner. The disc coupling has an outer disc support connected to the housing in a rotationally fixed manner, in particular permanently. Furthermore, the disc coupling has a set of friction discs. For example, the first of the friction discs are inner discs that are held on the inner disc support and are thus held by the inner disc support. In particular, the inner discs can be supported or are supported on the inner disc support in the peripheral direction of the planetary gear set running around the planetary gear set axis of rotation, such that torques running in the peripheral direction of the planetary gear set can be transferred between the inner discs and the inner disc support. The inner discs are thus coupled to the inner disc support in a torque-transferring, in particular rotationally fixed, manner. The second of the friction discs are, for example, outer discs, which are held on the outer disc support and are thus supported by the outer disc support. In particular, the outer discs can be supported or are supported on the outer disc support in the peripheral direction of the planetary gear set running around the planetary gear set axis of rotation, such that torques running in the peripheral direction of the planetary gear set can be transferred between the outer discs and the outer disc support. The outer discs are thus coupled to the outer disc support in a torque-transmitting manner. In particular, it is conceivable that the inner discs and the outer discs are arranged alternately one after the other, in particular when seen in the axial direction of the planetary gear set and thus along the planetary gear set axis of rotation. Since the outer disc support is connected to the housing in a rotationally fixed manner, in particular permanently, the inner disc support and the outer disc support can be connected to each other in a rotationally fixed manner by means of the friction discs, such that the inner disc support can be connected to the housing in a rotationally fixed manner via the outer disc support. The friction discs form a disc pack, for example. In other words, the set of friction discs is also referred to as a disc pack, for example.

In order to be able to implement a particularly advantageous lubricant supply, in particular of the disc pack, it is further provided in a known manner that the inner disc support is connected to the ring gear in a rotationally fixed manner, in particular permanently, such that the inner disc support and the ring gear can be rotated together or simultaneously around the planetary gear set axis of rotation in relation to the housing. Thus, the ring gear to be connected to the housing in a rotationally fixed manner by means of the disc coupling.

Furthermore, it is provided in a known manner that the ring gear and/or a cylindrical portion connected to the ring gear in a rotationally fixed manner has a first lubricant channel extending radially with respect to the planetary gear set axis of rotation of the planetary transmission. The feature that the optionally provided cylinder portion is connected to the ring gear in a rotationally fixed manner is to be understood to mean that the cylindrical cylinder portion, in particular on the inner circumference and/or outer circumference, and the ring gear are elements formed separately from one another and connected to one another in a rotationally fixed manner, in particular permanently, or the cylinder portion and the ring gear are formed from a single piece, i.e., are formed integrally with one each other. The feature that the ring gear and the cylinder portion are formed integrally with each other, i.e., are formed from a single piece, is to be understood to mean that the cylinder portion and the ring gear are not composed of components formed separately from one another and connected to one another, for example, but rather that the ring gear and the cylinder portion are formed from a single piece, i.e., are formed as a monobloc or are formed by a monobloc. The monobloc is understood to be a body formed from a single piece and thus integral or integrally manufactured.

Unless expressly stated otherwise, the terms "radial" and "axial" used here refer to the planetary gear set axis of rotation.

The feature that the first lubricant channel runs radially with respect to the planetary gear set axis of rotation is to be understood to mean that the first lubricant channel, in particular its direction of longitudinal extension, runs perpendicularly to the planetary gear set axis of rotation and thus perpendicularly to the axial direction of the planetary transmission and thus in the radial direction of the planetary transmission. In particular, this is to be understood to mean that the preferably liquid lubricant can flow through the first lubricant channel, which is formed, for example, as a bore and is formed by a bore and/or is formed as a through opening, in a first flow direction, wherein the first flow direction runs in the radial direction of the planetary transmission, i.e., perpendicularly to the planetary gear set axis of rotation and thus perpendicularly to the axial direction of the planetary transmission. In particular, the first flow direction in which the lubricant can flow through the first lubricant channel runs in the radial direction of the planetary transmission from the inside to the outside. Thus, a targeted and needs-based lubricant supply, in particular of the disc pack, can be implemented. The lubricant supply of the disc pack is understood to mean a supply of the disc pack with the lubricant.

The collecting channel, which acts as a lubricant catcher, in particular an oil catcher, or is formed as a lubricant catcher, can be used to catch and effect an advantageous lubricant flow of the lubricant in order to supply the friction discs, also known simply as discs, with the lubricant in a targeted manner, in particular to oil them. In particular, it is possible to supply the lubricant flow to the disc pack as needed, in particular via said outlet. This demand-orientated lubricant supply means that losses can be kept to a minimum, in particular, such that a particularly efficient operation can be represented.

In the context of the present disclosure, the terms "axial" and "radial", unless otherwise specified, refer to the planetary gear set axis of rotation of the planetary transmission, wherein the planet support, the ring gear, the inner disc support and the outer disc support are arranged coaxially to one another or coaxially to the planetary gear set axis of rotation. The inner disc support and the outer disc support are collectively referred to as disc supports. In the context of the present disclosure, the term "radially inside" is to be understood as follows: A first element, in particular rotatably mounted, is arranged radially inside another, second element, in particular rotatably mounted, element when the first element is arranged in a region of smaller radii, i.e., is arranged further inside than the second element when viewed in the radial direction of the planetary transmission. The term "radially outside" is therefore to be understood as follows: The first element is arranged radially outside the second element when the first element is arranged in a region of larger radii, i.e., when the first element is arranged further outside than the second element in the radial direction of the planetary transmission. "Axially overlapping" is to be understood in particular as follows: Two elements are arranged axially overlapping when they are arranged at least partially in the same axial region, in particular when seen in the axial direction of the planetary transmission. In other words, two elements are arranged axially overlapping each other when the elements have at least partially the same axial coordinates with respect to the planetary gear set axis of rotation as the reference axis. "Coaxial" is to be understood to mean that two elements, for example rotatably mounted, are arranged coaxially to each other when they can be rotated around the same axis, in particular in relation to each other and/or in relation to the housing.

In the context of the present disclosure, the feature that two components are connected to other in a rotationally fixed manner is to be understood to mean that the components connected to each other in a rotationally fixed manner are arranged coaxially to each other and, in particular when the components are driven, are rotated together or simultaneously around an axis of rotation common to the components, such as the planetary gear set axis of rotation, for example, at the same angular velocity, in particular in relation to the housing. The feature that two components are connected to each other in a torque-transmitting manner is to be understood to mean that the components are coupled to each other in such a way that torques can be transmitted between the components, wherein when the components are connected to each other in a rotationally fixed manner, the components are also connected to each other in a torque-transmitting manner.

The feature that two components are permanently connected to each other in a torque-transmitting manner is to be understood to mean that a switching element is not provided, for example, which can be switched between a coupling state connecting the components to each other in a torque-transmitting manner and a decoupling state in which no torques can be transmitted between the components via the switching element, but rather the components are constantly or always and thus permanently connected to each other in a torque-transmitting manner, i.e., in such a way that a torque can be transmitted between the components. Thus, for example, one of the components can be driven by the other component or vice versa, for example. In particular, the feature that the components are permanently connected to each other in a rotationally fixed manner is to be understood to mean that a switching element is not provided, for example, which can be switched between a coupling state connecting the components to each other in a rotationally fixed manner and a decoupling state in which the components are decoupled from each other and can be rotated in relation to each other, such that no torques can be transmitted between the components via the switching element, but rather the components are constantly or always, i.e., permanently connected to each other in a rotationally fixed manner or coupled to each other.

The feature that two components can be connected to each other in a rotationally fixed or torque-transmitting manner is to be understood to mean, in particular, that a switching element is allocated to the components that can be switched between at least one coupled state and at least one decoupled state. In the coupled state, the components are connected to each other by means of the switching element in a rotationally fixed or torque-transmitting manner. In the decoupled state, the components are decoupled from each other, such that in the decoupled state the components can be rotated in relation to each other, in particular around the component axis of rotation, and in particular such that no torques can be transmitted between the components via the switching element. In other words, "rotationally fixed" is to be understood to mean that two elements, in particular rotatably mounted elements, are connected to each other in a rotationally fixed manner when they are arranged coaxially to each other and are connected to each other in such a way that they are rotated at the same angular velocity, in particular around the common component axis of rotation and in particular in relation to the housing, in particular when the components are driven.

Moreover, in the context of the present disclosure, ordinal numerals, also referred to as ordinalia, such as "first", "second", etc. are not necessarily used in order to specify or imply a number or amount of elements to which the ordinal numerals refer, but rather in order to be able to unambiguously reference terms or elements to which the ordinal numerals are allocated or to which the ordinal numerals refer.

In order to be able to implement a particularly advantageous and needs-based lubricant supply, in particular of the disc pack, at least one planetary gear pin is also provided in an inherently known manner, in particular permanently connected to the planet support in a rotationally fixed manner. For example, the planetary gear pin is formed separately from the planet support and is connected to the planetary support in a rotationally fixed manner, in particular permanently, in such a way that the planetary gear pin and the planetary support can be rotated together around the planetary gear set axis of rotation in relation to the housing. In particular, the planetary gear pin is connected to the planetary support in a rotationally fixed manner in such a way that relative rotations between the planetary gear pin and the planetary support taking place around the planetary gear axis of rotation are prevented. At least one of the planetary gears is mounted on the planet gear pin so that it can rotate around the planetary wheel axis of rotation in relation to the planetary gear pin and in relation to the planetary support. Here, the planetary gear pin has a second lubricant channel running perpendicularly to the planetary gear axis of rotation. Since the planetary gear axis of rotation runs in parallel to the planetary gear set axis of rotation, for example, the second lubricant channel thus runs radially, for example, i.e., in the radial direction of the planetary transmission. For example, the second lubricant channel is fluidically connected to the first lubricant channel such that the lubricant flowing through the first lubricant channel can also flow through the second lubricant channel. In particular, this is to be understood to mean that at least one part of the lubricant flowing through the first lubricant channel can also flow through the second lubricant channel. In the current direction of the lubricant flowing through the first lubricant channel and the second lubricant channel, for example, the second lubricant channel is arranged upstream of the first lubricant channel.

The feature that the second lubricant channel runs perpendicularly to the planetary gear axis of rotation is to be understood to mean, in particular, that the lubricant can flow through the second lubricant channel in a second current direction, wherein the second current direction running perpendicularly to the planetary gear axis of rotation and thus, for example, also perpendicularly to the planetary gear set axis of rotation and thus, in particular, in the radial direction of the planetary transmission. In particular, the second current direction runs outwardly in the radial direction of the planetary gear pin and thus perpendicularly to the planetary gear axis of rotation, i.e., for example outwardly in the radial direction of the planetary transmission and the planetary gear. Thus, the lubricant can be channeled and guided advantageously and as required, in particular to the disc pack, in particular under the effect of centrifugal force. The effect of centrifugal force is to be understood to mean, in particular, that centrifugal forces act on the planetary gear pin and the planetary support and on the lubricant, which flows through the second lubricant channel and thus the planetary gear pin, due to the fact that the planet support and the planetary gear pin are rotated around the planetary gear set axis of rotation in relation to the housing. These centrifugal forces act outwardly, in particular in the radial direction of the planetary transmission, whereby the lubricant can be guided advantageously and as required, in particular in conjunction with the lubricant channels.

According to the invention, in addition to the first collecting groove, a second collecting groove is provided, which is connected to the planetary gear pin in a rotationally fixed manner, in particular permanently. Here, the planetary gear pin has a blind hole, wherein the second collecting groove is arranged adjacent to the blind hole, in particular when seen in the axial direction of the planetary gear pin and thus along the planetary transmission axis of rotation. The second collecting groove can, for example, collect the lubricant, in particular at least one part of the lubricant, and direct it specifically to and into the blind hole, in particular under the effect of centrifugal force. In particular, it is conceivable that the second lubricant channel opens into the blind hole. This can ensure a particularly advantageous supply of the lubricant to the second lubricant channel. For example, the second collecting channel can catch such a lubricant, which is thrown up and/or thrown off the at least one partial region of the planetary support, in particular when the planetary support is rotated, such that the second collecting groove can, for example, collect the lubricant moving outwardly in the radial direction of the planetary transmission and, in particular, guide it specifically into the blind hole. The aforementioned curved, in particular concave, surface of the first collecting groove points inwardly in the radial direction of the planetary transmission, for example. The explanations above and below regarding the first collecting groove can also be readily transferred to the second collecting groove and vice versa. It is thus conceivable, for example, that the second collecting groove has a second surface that acts as a second catching surface and is curved, in particular concave. For example, the curved second surface of the second collecting groove points inwards in the radial direction of the planetary transmission. In particular, the second surface of the collecting groove faces towards the blind hole or points in the direction of the blind hole. In doing so, a particularly advantageous guidance and conduction of the lubricant can be implemented, such that the disc pack in particular can be supplied with the lubricant in a particularly advantageous manner.

Furthermore, according to the invention, it is provided that the second collecting groove is arranged radially within the collecting groove and axially at least partially overlapping with the first collecting groove. In this way, an ideal lubricant distribution is possible.

Here, it has been shown to be particularly advantageous when the at least one planetary gear is rotatably mounted on the planetary gear pin via, in particular at least or exactly, one roller bearing. Here, it is preferably provided that the second lubricant channel is arranged axially overlapping the inner disc support with respect to the planetary axis of rotation and thus when seen in the axial direction of the planetary transmission. Here, it is conceivable, for example, that the second lubricant channel in the radial direction of the planetary transmission is at least partially, in particular at least predominantly and thus at least more than half or completely, overlapped outwardly by the inner disc support and is thus covered. Thus, a particularly advantageous lubricant supply, in particular of the disc pack, can be implemented, in particular to the effect that an advantageously large quantity of lubricant can be supplied to the disc pack in a short time.

In order to be able to implement a particularly advantageous lubricant supply, it is provided in a further design of the invention that the second lubricant channel is arranged axially overlapping with the inner disc support.

A further embodiment is characterized in that the inner disc support has a radially running third lubricant channel. For example, the third lubricant channel is fluidically connected to the second lubricant channel such that at least one part of the lubricant flowing through the second lubricant channel can also flow through the third lubricant channel. The feature that the third lubricant channel runs radially is to be understood to mean, in particular, that the lubricant can flow through the third lubricant channel in a third flow direction, wherein the third flow direction runs in the radial direction of the planetary transmission, i.e., perpendicularly to the planetary gear set axis of rotation. In particular, the third flow direction runs outwardly in the radial direction of the planetary transmission, whereby a particularly advantageous supply of lubricant to the disc pack can be achieved.

In a further, particularly advantageous embodiment of the invention, it is provided that the first collecting groove has at least one circular section arranged coaxially to the planetary gear set axis of rotation. In doing so, the lubricant can be collected in a particularly advantageous manner and channeled in a targeted manner such that the disc pack can be supplied with the lubricant in a particularly advantageous manner.

A further embodiment is characterized by a lubricant tube arranged in parallel to the planetary gear set axis of rotation, which is also referred to as an oil tube, in particular when the lubricant is in the form of an oil. The feature that the lubricant tube runs in parallel to the planetary gear set axis of rotation is to be understood to mean, in particular, that the lubricant can flow through the lubricant tube or a fourth lubricant channel of the lubricant tube in a fourth flow direction, wherein the fourth flow direction runs in parallel to the axial direction of the planetary transmission, i.e., in parallel to the planetary gear set axis of rotation. For example, the lubricant tube or the fourth lubricant channel has the aforementioned outlet, such that the lubricant can be sprayed out, for example by means of the lubricant tube or from the lubricant tube, which can be collected, for example by means of the first collecting groove. Thus, a particularly needs-based supply of lubricant to the disc pack can be implemented. In particular, this makes it possible to supply the disc pack with a large amount of the lubricant as required due to or in the event of a switching operation and to thus cool it considerably as a result. To do so, for example, the lubricant is provided by means of the lubricant tube, i.e., it is sprayed out from the lubricant tube, in particular from the outlet, whereupon the ejected lubricant can be collected by the first collecting groove, for example, and guided to the disc pack in a targeted and needs-based manner.

In a further particularly advantageous embodiment of the invention, a plate element is provided which is connected to the ring gear in a rotationally fixed manner, in particular permanently. The plate element is designed to support the ring gear and/or the inner disc support in relation to a bearing point arranged or placed radially inside the ring gear, in particular to rotatably support it on the bearing point. In doing so, such a design of the planetary transmission can be implemented such that the disc pack can be supplied with lubricant in a particularly advantageous manner.

Finally, it has been shown to be particularly advantageous when the set of friction discs is arranged radially outside and at least partially axially overlapping with a toothing region of the ring gear, whereby a particularly advantageous and needs-based lubricant supply of the disc pack can be achieved. For example, the toothing region of the ring gear meshes with the respective planetary gear, in particular a respective, corresponding, further toothing region of the respective planetary gear.

Further advantages, features and details of the invention emerge from the following description of preferred exemplary embodiments and by means of the drawings. The features and feature combinations mentioned above in the description and the features and feature combinations mentioned below in the description of the figures and/or shown only in the figures can be used not only in the respectively specified combination, but also in other combinations or on their own, without leaving the scope of the invention.

BRIEF DESCRIPTION OF THE DRAWING FIGURES

Figure 2:
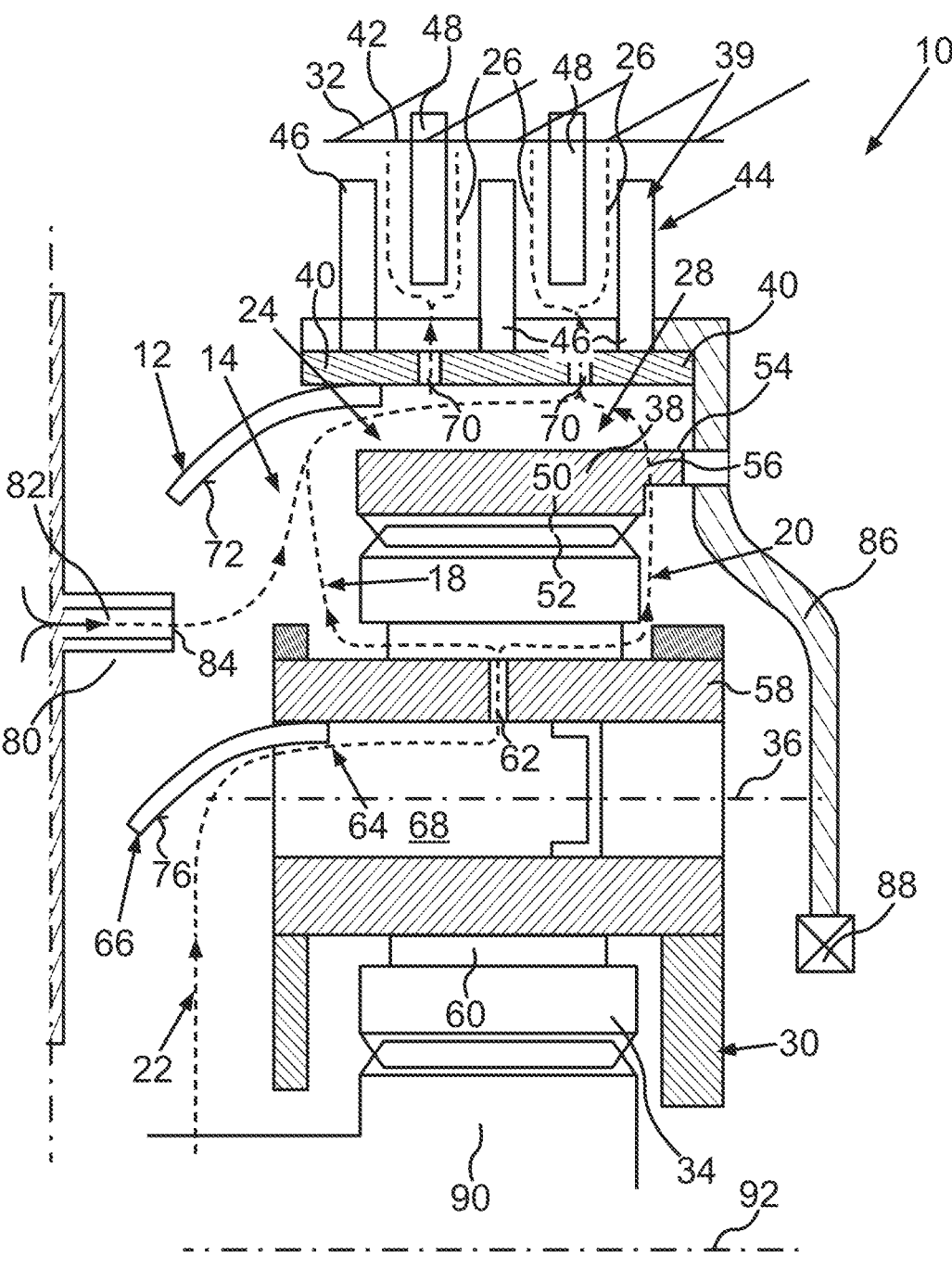

The drawings show in:

FIG. 1, as a cut-out, a schematical longitudinal sectional view of a first embodiment of a planetary transmission, in particular for a motor vehicle; and FIG. 2, as a cut-out, a schematic longitudinal sectional view of a second embodiment of the planetary transmission.

In the Figures, the same or functionally identical elements are provided with the same reference numerals.

DETAILED DESCRIPTION

In a schematic longitudinal sectional view, FIG. 1 shows as a cut-out a planetary transmission 10 for a drivetrain of a motor vehicle, also referred to simply as a vehicle. This means that the motor vehicle in its completely manufactured state has the drivetrain and can be driven by means of the drivetrain, wherein the drivetrain has the planetary transmission 10. The motor vehicle has, for example, at least or exactly two vehicle axes arranged consecutively in the longitudinal direction of the vehicle of the motor vehicle and thus one behind the other, which are also simply referred to as axes. The respective vehicle axis has at least or exactly two vehicle wheels, also referred to simply as wheels, wherein the respective vehicle wheels of the respective vehicle axis are arranged on opposite sides of the motor vehicle in the transverse direction of the vehicle of the motor vehicle. The vehicle wheels are ground contact elements, via which the motor vehicle can be supported or is supported downwardly on a ground in the vertical direction of the vehicle of the motor vehicle. If the motor vehicle is driven along the ground while the motor vehicle is supported downwardly on the ground via the ground contact elements in the vertical direction of the vehicle, the ground contact elements thus roll, in particular directly, on the ground. Here, the vehicle wheels can be driven at least or precisely on one of the vehicle axes by means of a drive device of the drivetrain, which can have the vehicle axes, whereby the motor vehicle can be driven as a whole. The vehicle wheels that can be driven by means of the drive device are also referred to as drivable wheels, driven wheels or drive wheels. When the vehicle wheels are referred to in the following, this is understood to mean the drive wheels, unless otherwise specified. In particular, the drive device can drive the vehicle wheels via the planetary transmission 10. For this purpose, for example, the drive device has at least one electric engine and/or an internal combustion engine. The motor vehicle is thus designed, for example, as a hybrid vehicle or as an electric vehicle, in particular as a battery electric vehicle (BEV).

The planetary transmission 10 has a first collecting groove 12 for a lubricant. The lubricant, which can be a component of the planetary transmission 10, is preferably a liquid lubricant, in particular oil. In FIG. 1, different flows of the lubricant, also referred to as streams, are illustrated particularly schematically by dashed lines, wherein a first of the flows is labelled with 14, a second of the flows is labelled with 16, a third of the flows is labelled with 18, and a fourth of the flows is labelled with 20. As will be explained in more detail below, the flows 16, 18 and 20 are parts of a fifth of the flows labelled with 22, wherein the fifth flow is also referred to as the total flow. A sixth of the flows is labelled with 24, and a seventh of the flows is labelled with 26.

The planetary transmission 10 has a planetary gear set 28, which is also referred to as a planetary set. The planetary gear set 28 has at least one planet support 30, which can be rotated around a planetary gear set axis of rotation 92 in relation to a housing 32 of the planetary transmission 10. It can be seen that the planetary support 30 is at least partially arranged in the housing 32. The planetary gear set 28 has planetary gears rotatably mounted on the planetary support 30, of which a planetary gear labelled with 34 can be seen in FIG. 1. The example of planetary gear 34 shows that the respective planetary gear 34 is mounted on the planetary support 30 so as to rotate at least indirectly around a respective planetary gear axis of rotation 36 in relation to the planetary support 30. Moreover, the planetary gear set 28 has a ring gear 38, which meshes with the planetary gears 34, in particular permanently. The ring gear 38 can be rotated around the planetary gear set axis of rotation 92 in relation to the housing 32. In principle, it would be conceivable that the planetary gear set 28 has a sun gear not shown in the figures, which can be rotated in relation to the housing 32 around the planetary gear set axis of rotation 92, for example, and meshes with the planetary gears 34. The planetary gear axes of rotation 36 are spaced apart from one another in the peripheral direction of the planetary transmission 10 running around the planetary gear set axis of rotation 92. Moreover, the respective planetary gear axis of rotation 36 extends in parallel to the planetary gear set axis of rotation 92, wherein the respective planetary gear axis of rotation 36 is spaced apart from the planetary gear set axis of rotation 92. For example, the planetary gear axes of rotation 36 are arranged on a circle, the center of which lies, for example, on the planetary gear set axis of rotation 92.

Moreover, the planetary transmission 10 has a disc coupling 39, also referred to as a friction coupling or designed as a friction coupling. The disc coupling 39 comprises an inner disc support 40 as the first disc support, which is connected to the first collecting groove 12 in a rotationally fixed manner, in particular permanently. For example, the first collecting groove 12 is formed separately from the inner disc support 40 and is connected to the inner disc support 40 in a rotationally fixed manner, in particular permanently. Moreover, the disc coupling 39 comprises an outer disc support 42 as a second disc support, which is connected to the housing 32 of the planetary transmission 10 in a rotationally fixed manner, in particular permanently. Furthermore, the disc coupling 39 comprises a set 44 of friction discs 46 and 48. The set is a disc pack or is also referred to as a disc pack, wherein the disc pack is formed by the friction discs 46 and 48. It can be seen from FIG. 1 that the friction discs 46 are inner discs, wherein the friction discs 48 are outer discs. The inner discs are held on the inner disc support 40, i.e., are supported by the inner disc support 40. In particular, the inner discs can be supported or are supported on the inner disc support 40 in the peripheral direction of the planetary transmission 10 running around the planetary gear set axis of rotation 92, in particular on both sides, such that torques running around the planetary gear set axis of rotation 92 can be transmitted between the inner discs and the inner disc support 40. Thus, the inner discs are coupled to the inner disc support 40 in a torque-transmitting, in particular rotationally fixed, manner for torques running around the planetary gear set axis of rotation 92. The same applies to the outer discs. The outer discs are held on and supported by the outer disc support 42, wherein the outer discs can be supported or are supported on the outer disc support 42 in the peripheral direction of the planetary transmission 10. Thus, torques acting around the planetary gear set axis of rotation 92 can be transmitted, in particular on both sides, between the outer discs and the outer disc support 42, such that the outer discs are coupled to the outer disc support 42 in a torque-transmitting, in particular rotationally fixed, manner for torques running around the planetary gear set axis of rotation. If the disc pack is pressed in the axial direction of the planetary transmission 10 and thus along the planetary gear set axis of rotation 92 in such a way that the friction discs 46 and 48 are pressed together in the axial direction of the planetary transmission 10, the disc supports are connected to each other via the friction discs 46 and 48 in a torque-transmitting, in particular rotationally fixed, manner.

In order to be able to implement a particularly advantageous and needs-based supply of lubricant to the disc pack, also referred to as lubricant supply, the inner disc support 40 is connected to the ring gear 38 in a rotationally fixed manner, in particular permanently. In doing so, the ring gear 38 can be connected to the housing 32 in a rotationally fixed manner via the inner disc support and by means of the disc pack, such that the ring gear 38 can be connected to the housing 32 in a rotationally fixed manner by means of the disc coupling 44. The first collecting groove 12 is connected to the inner disc support 40 in a rotationally fixed manner, in particular permanently. For example, the first collecting groove 12 is formed separately from the inner disc support 40 and is connected to the inner disc support 40 in a rotationally fixed manner, in particular permanently.

It can be seen from FIG. 1 that the ring gear 38 has a first toothing section 50, also referred to as a first toothing region, which for example has a first toothing or is formed by a first toothing. In particular, the first toothing is an inner toothing. The respective planetary gear 34 has a second toothing section 52, also referred to as a second toothing region, which has a second toothing or is formed by a second toothing. The first toothing is an inner toothing, and the second toothing is an external toothing. The toothing section 50 is in engagement with the toothing section 52 and vice versa, such that the ring gear 38 and the respective planetary gear 34 mesh with each other, in particular directly, via their toothing sections 50 and 52. In the axial direction of the planetary transmission 10 and the respective planetary gear 34 and the ring gear 39, a cylindrical section 54 is attached to the toothing section 50 of the ring gear 39, which is a cylindrical, in particular hollow cylindrical, longitudinal region presently on the inner periphery and outer periphery. The cylindrical section 54 is connected to the ring gear 38 in a rotationally fixed manner, in particular permanently, in the present case advantageously in such a way that the cylindrical section 54 and the ring gear 38 are formed integrally with each other, i.e., are formed from a single piece. It can be seen that the cylinder section 54 is free of the toothing section 50 and free of any toothing at all.

In the first embodiment, the cylinder section 54 has a first lubricant channel 56 running radially with respect to the planetary gear set axis of rotation 92 of the planetary transmission 10. The feature that the first lubricant channel 56 extends radially is to be understood to mean that the lubricant channel 56 extends in a radial direction of the planetary transmission 10 and thus perpendicularly to the planetary gear set axis of rotation 92. Expressed again in other words, the lubricant channel 56 can be flowed through by the lubricant, in the present case by the flow 24, in a first flow direction, which runs in the radial direction of the planetary transmission 10, i.e., perpendicularly to the planetary gear set axis of rotation 92. In particular, the first flow direction runs in the radial direction of the planetary transmission 10 from the inside to the outside and thus away from the planet gear 34 and the ring gear 38 and towards the disc pack. This first flow direction of the lubricant results in particular from a centrifugal force effect, in the context of which centrifugal forces act on the lubricant in the radial direction of the planetary transmission 10 from the inside to the outside in such a way that the ring gear 38 is rotated around the planetary gear set axis of rotation 92 in relation to the housing 32. In doing so, the centrifugal forces act on the ring gear 38 and on the lubricant, which is arranged on the ring gear 38 or flows along the ring gear 39.

The planetary transmission 10 has, in particular the planetary gear 34, a planet gear pin 58, which is connected to the planetary support 30 in a rotationally fixed manner, in particular permanently. The planetary gear 34 is mounted on the planetary gear pin 58, which is also simply referred to as a pin, so that it can rotate around the planetary gear axis of rotation 36 in relation to the planetary gear pin 58 and in relation to the planetary support 30, presently via a roller bearing 60. The planetary gear pin 58 has a second lubricant channel 62 running perpendicularly to the planetary gear axis of rotation 36 and thus in the radial direction of the planetary transmission 10. This means that the second lubricant channel 62 runs in the radial direction of the planetary transmission 10 and thus of the planetary gear 34 and can be flowed through in a second flow direction by the lubricant, in particular by a seventh of the flows of the lubricant, wherein the seventh flow is labelled with 64. Here, the second flow direction runs perpendicularly to the planetary gear axis of rotation 36 and also perpendicularly to the planetary gear set axis of rotation 92. It can be seen that the second lubricant channel 62 is arranged axially overlapping with the roller bearing 60 with respect to the planetary gear set axis of rotation 92 and also with respect to the planetary gear axis of rotation 36.

In the first embodiment, the planetary transmission 10 has a second collecting groove 66 provided in addition to the first collecting groove, which is connected, in particular directly, to the planetary gear pin 58 in a rotationally fixed manner. It can be seen that the collecting groove 66 is arranged radially within the first collecting groove 12. In other words, the first collecting groove 12 is arranged further outwards in the radial direction of the planetary transmission 10 than the collecting groove 66, wherein at least one partial region of the collecting groove 66 is overlapped outwards in the radial direction of the planetary transmission 10 by the first collecting groove 12. Here, the planetary gear pin 58 has a blind hole 68. The blind hole 68 is an opening, also referred to as a hole, which is open at its first axial end, which faces towards the collecting groove 66. At its second axial end, the opening (the blind hole 68) is closed, wherein the second end is opposite the first end in the axial direction of the planetary gear pin 58 and the planetary transmission 10 as a whole and faces away from the collecting groove 66. The term "blind hole" 68 thus refers here to a hole that is closed on one side. The hole closed on one side can be formed by an inherently known blind hole or by a cylinder initially open on both sides, which is then subsequently closed on one side. It can be seen that the second collecting channel 66 is arranged axially adjacent to the blind hole 68, in particular at the first end.

The inner disc support 40 has radially running, third lubricant channels 70. This means that the respective third lubricant channel 70 runs in the radial direction of the planetary transmission 10, i.e., the lubricant can flow through it in a third flow direction, wherein the third flow direction runs in the radial direction of the planetary transmission 10 and thus perpendicularly to the planetary gear set axis of rotation 92.

The first collecting groove 12 has a concave, first surface 72 pointing inwards in the radial direction of the planetary transmission 10, which is formed as a first collecting surface for collecting the lubricant. In particular, the surface 72 faces towards the second collecting channel 66. The first collecting channel 12, in particular the surface 72, has a circular section 74 arranged coaxially to the planetary gear set axis of rotation 92. The second collecting groove 66 has a second surface 76 pointing inwards in the radial direction of the planetary transmission 10, which is formed concavely and points away from the surface 72.

It can be seen that the second collecting channel 66 has at least one fourth lubricant channel 78, which advantageously runs radially, i.e., in the radial direction of the planetary transmission 10, i.e., advantageously radially with respect to the planetary gear set axis of rotation 92. This means that the lubricant, in particular a current 16, can flow through the fourth lubricant channel 78, which is formed as a through opening, in a fourth flow direction, wherein the fourth flow direction runs in the radial direction of the planetary transmission 10. It can be seen that the fourth lubricant channel 78 completely penetrates the second collecting groove 66 in the radial direction. Through the fourth lubricant channel 78, a part of the lubricant collected by the second collecting channel 66 can be channeled past the second lubricant channel 62 and to the first collecting groove 12.

A lubricant tube 80 arranged or running in parallel to the planetary gear set axis of rotation 92 is also provided. This means that the lubricant tube 80, in particular a fifth lubricant channel 82 of the lubricant tube 80, can be flowed through by the lubricant, in particular by the current 14, in a fifth flow direction, wherein the fifth flow direction runs in the axial direction of the planetary transmission 10, in the present case in parallel to the planetary gear set axis of rotation 92. The lubricant channel 82 and thus the lubricant tube 80 have an outlet opening 84, also known simply as an outlet, through which the lubricant forming the flow 14 can flow. The lubricant can flow out of the lubricant channel 82 and thus out of the lubricant tube 80 via the outlet opening 84. In particular, the lubricant tube 80 can spray out the lubricant from the lubricant channel 82 via the outlet opening 84 and thus provide it. The lubricant tube 80, in particular the outlet opening 84, is arranged axially overlapping with the collecting groove 12, in the present case in such a way that the outlet opening 84 is overlapped outwards in the radial direction of the planetary transmission 10 by the collecting groove 12, in particular by the surface 72. For example, the roller bearing 60 is designed as a needle bearing.

In the first embodiment, the planetary transmission 10 has a plate element 86, which is connected to the ring gear 38 in a rotationally fixed manner, in particular permanently. Via the plate element 86, the ring gear 38 and, in the first embodiment, also the inner disc support 40 are to be supported or are supported opposite or at a bearing point arranged radially inside the ring gear 39, in particular mounted rotatably in relation to the housing 32 around the planetary gear set axis of rotation 92.

In the first embodiment, the planetary gear pin 58 is hollow, in particular in such a way that the planetary gear pin 58 is completely penetrated by a through opening in its axial direction. To form the blind hole 68, a closure element 87, also known as a plug, is arranged in the through opening of the planetary gear pin 58, by means of which the blind hole 68 is fluidically blocked or closed at its second end.

It can be seen from FIG. 1 that the lubricant forming the current 14, which flows through the outlet opening 84 and thus flows out of the lubricant channel 82 via the outlet opening 84, flows outwardly in the radial direction of the planetary transmission 10 and is collected by means of the surface 72 or at the surface 72 by means of the collecting groove 12 and guided in a targeted manner in the direction of the lubricant channel 56. The current 22 or the lubricant forming the current 22 is, for example, lubricant that has been spun up and/or spun off and is collected by means of the surface 76 and thus by means of the collecting groove 66 and can flow along the collecting groove 66, in particular via the effect of centrifugal force, namely to the lubricant channel 78. A part of the lubricant collected by means of the collecting groove 66 can, for example, flow through the lubricant channel 78 and thus forms the current 16. A further part of the lubricant collected by means of the collecting groove 66, which does not flow through the lubricant channel 78, forms the current 64 and is guided and conveyed by means of the collecting groove 66 specifically into the blind hole 68 and from there to and through the lubricant channel 62, in particular under the effect of centrifugal force.

The lubricant flowing through the lubricant channel 62 in the radial direction of the planetary transmission 10 from the inside to the outside, i.e., the current 64, forms the currents 18 and 20. In other words, the currents 18 and 20 result from the current 64. The current 18 flows past the planetary gear 34 on this side of the planetary gear 34 when viewed in the axial direction of the planetary transmission 10, and the current 20 flows past the planetary gear 34 on the other side of the planetary gear 34 when viewed in the axial direction of the planetary gear 10. It can be seen that the currents 18, 16 and 14 combine, so to speak, and thus form the current 24, which flows in the radial direction of the planetary transmission 10 from the inside to the outside through the lubricant channel 56. The currents 20 and 24 result in the lubricant flowing through the lubricant channels 70, which thirdly flows through the lubricant channels 70 in the radial direction of the planetary transmission 10 from the inside to the outside. The lubricant flowing through the lubricant channels forms the currents 26, which thus result from the currents 20 and 24. It can be seen that the friction discs 46 and 48 can be cooled and/or lubricated by means of the current 26, i.e. the lubricant forming the current 26. It is conceivable that the ring gear 38 and the inner disc support 40 are formed from a single piece, i.e. are formed integrally with each other.

FIG. 2 shows, as a cut-out, in a schematic longitudinal sectional view a second embodiment of the planetary transmission 10. Here, in particular, it is conceivable that the ring gear 38 and the inner disc support 40 are formed separately from each other and are connected to one another in a rotationally fixed manner, in particular permanently. For example, the plate element 86 and the inner disc support 40 are formed from a single piece, i.e., are formed integrally with each other. The aforementioned bearing point is depicted particularly schematically in FIG. 2 and is labelled with 88. For example, the respective collecting groove 12, 66 is formed as a respective collecting ring. The respective current of the lubricant is, for example, a respective mass and/or volume flow of the oil.

It can be seen that the lubricant is passed through the planetary gear pin 58, in particular through the lubricant channel 62, and the disc pack receives the lubricant thrown off by or from it. In addition, in the first embodiment, the flows 14 and 16 are provided, which bypass the planetary gear pin 58 and flow to the disc pack via the lubricant channel 56 and at least one of the lubricant channels 70. It is conceivable that, in a first operating state, a first quantity of the lubricant, in particular a first volume and/or mass flow of the lubricant, is channeled, in particular conveyed, through the lubricant channel 82 and thus through the outlet opening 84. The first quantity can be zero or greater than zero. In a second operating state, for example, a second quantity of the lubricant that is greater than the first quantity, in particular a second volume and/or mass flow of the lubricant that is greater than the first volume and/or mass flow, is passed through the lubricant channel 82 and thus through the outlet opening 84, wherein the second quantity is greater than zero. This means that a quantity of the lubricant flowing through the outlet opening 84, in particular per unit of time, in particular a volume and/or mass flow of the lubricant flowing through the outlet opening 84, is greater in the second operating state than in the first operating state, i.e., is increased in the second operating state compared to the first operating state. In the second operating state, for example, a switching process takes place in which, for example, the multi-disc coupling 44 is actuated, in particular closed.

In the planetary transmission 10, a particularly advantageous supply of the lubricant to the disc pack can be ensured in particular by the fact that the current 64 resulting from the current 22 and thus the currents 20 and 24 resulting from the current 64 are guided to the disc pack via the planetary gear pin 58 or through the planetary gear pin 58, and in addition, the currents 14 and 16, which bypass the planetary gear pin 58, are guided to the disc pack. In doing so, a particularly needs-based supply of lubricant to the disc pack can be ensured. For example, the respective lubricant channel is formed as a respective through opening and/or as a respective bore. For example, the quantity, in particular the volume and/or mass flow, of the lubricant is hydraulically increased in the second operating state compared to the first operating state.

The second embodiment differs in particular from the first embodiment in that the second collecting groove 66 does not have the lubricant channel 78. In the first embodiment, the current 22 is divided into the currents 16 and 64 as partial flows by means of the lubricant channel 78, which is omitted in the second embodiment. Thus, in the second embodiment, the current 16 is omitted. In the second embodiment, the current 64 results from the current 22 through the blind hole 68 and thus through planetary gear pin 58, in such a way that the current 64 corresponds to the current 22. As in the first embodiment, the current 64, which flows through the lubricant channel 62, is divided into the currents 18 and 20. In the second embodiment, the current 14 flows through the lubricant channel 82 and thus through the outlet opening 84, wherein, as in the first embodiment, the currents 14 and 18 are collected by means of the first collecting groove 12. In doing so, the currents 14 and 18 are combined to form the current 24. The lubricant forming the currents 20 and 24 flows in the radial direction of the planetary transmission 10 from the inside to the outside through the lubricant channels 70 and in doing so to the disc pack, in particular into the disc pack. Thus, a particularly advantageous, needs-based lubricant supply to the disc pack can be ensured.

The aforementioned sun gear can be seen in FIG. 2 as a cut-out and is labelled with 90. Whereas in the first embodiment the lubricant channel 56 is arranged on a side of the toothing section 50 facing towards the collecting groove 12, in the second embodiment the lubricant channel 56 is arranged on a side of the toothing section 50 facing away from the collecting groove 12.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

10 Planetary transmission
12 First collecting groove
14 Current
16 Current
18 Current
20 Current 22 Current
24 Current
26 Current
28 Planetary gear set
30 Planetary support
32 Housing
34 Planetary gear
36 Planetary gear axis of rotation
38 Ring gear
39 Disc coupling
40 Inner disc support
42 Outer disc support
44 Set of friction discs
46 Friction disc
48 Friction disc
50 First toothing portion
52 Second toothing portion
54 Cylinder portion
56 First lubricant channel
58 Planetary gear pin
60 Roller bearing
62 Second lubricant channel
64 Current
66 Second collecting groove
68 Blind hole
70 Third lubricant channel
72 First surface
74 Circular section
76 Second surface
78 Fourth lubricant channel
80 Lubricant tube
82 Fifth lubricant channel
84 Outlet opening
86 Plate element
87 Closing element
88 Bearing point
90 Sun gear

The invention claimed is:

1. A planetary transmission comprising:
a housing;
a first collecting groove configured to collect a lubricant;
a planetary gear set comprising
    a planetary support rotatable around a planetary gear set axis of rotation relative to the housing;
    planetary gears rotatably mounted on the planetary support;
    a ring gear meshing with the planetary gears, wherein the ring gear has a first lubricant channel running radially with respect to the planetary gear set axis of rotation or a cylinder portion connected to the ring gear in a rotationally fixed manner has the first lubricant channel; and
    a planetary gear pin connected to the planetary support in a rotationally fixed manner, wherein at least one of the planetary gears is rotatably mounted on the planetary gear pin around a planetary gear axis of rotation, wherein the planetary gear pin has a second lubricant channel running perpendicularly to the planetary gear axis of rotation;
a second collecting groove connected to the planetary gear pin in a rotationally fixed manner; and
a disc coupling comprising
    an inner disc support connected to the first collecting groove in a rotationally fixed manner and connected to the ring gear in a rotationally fixed manner;

an outer disc support connected to the housing in a rotationally fixed manner; and a set of friction discs, wherein the planetary gear pin has a blind hole, wherein the second collecting groove is arranged adjacently to the blind hole, and wherein the second collecting groove is arranged radially inside the first collecting groove and axially at least partially overlapping with the first collecting groove.

2. The planetary transmission of claim 1, wherein the at least one of the planetary gears is mounted rotatably on the planetary gear pin via a roller bearing, wherein the second lubricant channel is arranged axially overlapping with the roller bearing with respect to the planetary gear set axis of rotation.

3. The planetary transmission of claim 1, wherein the second lubricant channel is arranged axially overlapping with the inner disc support.

4. The planetary transmission of claim 1, wherein the inner disc support has a third lubricant channel running radially.

5. The planetary transmission of claim 1, wherein the first collecting groove has at least one circular section arranged coaxially to the planetary gear set axis of rotation.

6. The planetary transmission of claim 1, further comprising:

a lubricant tube arranged in parallel to the planetary gear set axis of rotation, wherein the lubricant tube is arranged axially adjacent to or axially overlapping with the first collecting groove.

7. The planetary transmission of claim 1, further comprising:

a plate element connected to the ring gear in a rotationally fixed manner and configured to support the ring gear or the inner disc support relative to a bearing point arranged radially inside the ring gear.

8. The planetary transmission of claim 1, wherein the set of friction discs is arranged radially outside of and at least partially axially overlapping with a toothing region of the ring gear.

9. The planetary transmission of claim 1, wherein the second collecting groove has a fourth lubricant channel configured to guide a part of the lubricant collected by the second collecting groove past the second lubricant channel and to the first collecting groove.

\* \* \* \* \*